United States Patent [19]

Chakraborty et al.

[11] Patent Number: 5,262,191

[45] Date of Patent: Nov. 16, 1993

[54] STARCH JELLY CANDY

[75] Inventors: Kumaresh C. Chakraborty, Munster, Ind.; Roxane M. Bishop, Russellville, Ala.; Larry Benko, Schererville; Mary Ann Meschi, Highland, both of Ind.

[73] Assignee: American Maize-Products Company, Stamford, Conn.

[21] Appl. No.: 856,711

[22] Filed: Mar. 24, 1992

[51] Int. Cl.$^5$ .................................................. A23G 3/00
[52] U.S. Cl. ..................... 426/578; 426/658; 426/660; 426/661
[58] Field of Search ............... 426/578, 579, 660, 661, 426/658

[56] References Cited

U.S. PATENT DOCUMENTS

| | | | |
|---|---|---|---|
| 3,218,177 | 11/1965 | Robinson et al. | 426/660 |
| 3,265,508 | 8/1966 | Wurzburg et al. | 426/660 |
| 3,265,509 | 8/1966 | Wurzburg et al. | 426/660 |
| 3,446,628 | 5/1969 | Schoch et al. | 426/660 |
| 3,687,690 | 8/1972 | Moore et al. | 426/660 |
| 4,073,959 | 2/1978 | Durand | 426/660 |
| 4,120,987 | 10/1978 | Moore | 426/660 |
| 4,225,627 | 9/1980 | Moore | 426/660 |
| 4,567,055 | 1/1986 | Moore | 426/660 |
| 4,704,293 | 11/1987 | Moore et al. | 426/660 |
| 4,726,957 | 2/1988 | Lacourse et al. | 426/660 |
| 4,874,628 | 10/1989 | Eden et al. | 426/660 |
| 4,886,678 | 12/1989 | Chiu et al. | 426/660 |
| 5,034,239 | 7/1991 | Mauro et al. | 426/660 |
| 5,035,912 | 7/1991 | Furcsik et al. | 426/660 |

OTHER PUBLICATIONS

Leighton, Alfred E., "A Text Book on Candy Making", The Manufacturing Confectioner Publishing Co., Oak Park, Illinois, 1952, pp. 78–102.

Wurzburg, O. B., "Modified Starches: Properties and Uses", CRC Press, Inc., Boca Raton, Florida, pp. 17–23.

*Primary Examiner*—Jeanette Hunter
*Attorney, Agent, or Firm*—Lucas & Just

[57] ABSTRACT

The starch jelly candy is made with a blend of two starch components, one being an acid converted, high amylose starch having a dry alkaline fluidity of 20 ml to 70 ml and the other being either a thin-boiled common or an oxidized starch. The starch jelly candy made with the two starch components has excellent clarity and no tailings. The acid converted starch is made at a very low pH, high temperature and short reaction time.

17 Claims, No Drawings

STARCH JELLY CANDY

This invention relates to a starch jelly candy and, more particularly, to a starch jelly candy made from a starch jelly formulation having a blend of acid converted high amylose starch and either a thin-boiled starch or an oxidized starch.

Starch jelly candies, also known as jelly gum confections, gum drops, gum slices, fruit gums, jelly beans or jelly bean centers, are typically made from a sweetener, starch and water. The starch provides texture and body to the candy as well as water retention properties. Typically, the starch is a modified starch such as an acid thinned common corn starch. Starch jelly candies are a class of confectionary which is generally characterized by a short, relatively rigid, resilient texture as compared to the tactile, long, cream-like texture of marshmallows, caramels and the like.

The use of an acid thinned common starch in combination with an acid thinned or acid converted high amylose starch in confectionaries is suggested in U.S. Pat. Nos. 3,687,690; 4,225,627; and 4,726,957. The '690 patent teaches using an acid thinned cereal starch as a diluent with an acid thinned high amylose starch. The '627 patent focuses on demolding of candy, but discloses a starch jelly candy made with an acid thinned regular dent corn starch and an acid hydrolyzed 55% amylose starch. The '957 patent discloses a starch jelly candy which employs either an acid hydrolyzed or oxidized starch having an amylose content between 25 and 35% in combination with an acid thinned high amylose starch having an amylose content between 65 and 80%.

Starch jelly candy manufacturers prefer that the starch jelly candy be brilliant in appearance and have no tailings during manufacture and no tailings during consumption. Tailings are the strings which occur when the candy is separated into pieces. Tailing during manufacture occurs between the dispenser and the shots of candy in the mold. Tailing during consumption occurs when one bites into the candy and the candy does not break or fracture cleanly. Naturally, caramel and toffee candies are supposed to have tailings, and the '690 patent specifically teaches that candies made in accordance with its teachings have a stringy or long characteristic.

Starch jelly candy, although often colored, is supposed to be brilliant or translucent. In fact, to the eye of the consumer, the more brilliant the candy, the higher the quality. Naturally, toffees and caramels are supposed to be opaque and brilliance is not essential to a toffee or caramel. Both the brilliance or lack of brilliance and tailings are attributable to the starch component of the candy.

It has now been discovered that by carefully controlling the acid hydrolysis of the high amylose starch, tailings are eliminated both in manufacture and consumption and that a brilliant starch jelly candy can be made.

It has been found that the starch jelly candy made using the starch formulation of the present invention sets rapidly, thereby reducing the time between molding and packaging. It has been found that starch jelly candies made in accordance with the present invention dry within 24 hours. This is both surprising and unexpected since other starch jelly candies made from unmodified high amylose starch or conventional acid converted high amylose and acid thinned common starch take about 40 hours to dry. This fast set time translates into savings to the candy manufacturer.

Broadly, a starch jelly candy made in accordance with the present invention employs a starch blend of an acid converted high amylose starch made in accordance with the present invention and either a thin boiled common starch or an oxidized common starch. Acid thinned common starch is the preferred partner in the blend.

More specifically, the starch jelly candy of the present invention is made from a starch jelly candy formulation comprising a sweetener; water; and a starch blend comprising a low amylose, low viscosity starch and an acid converted high amylose starch, said low amylose, low viscosity starch having an alkaline fluidity of about 50 ml to about 100 ml, an amylose content below about 35% by weight, and selected from a group consisting of thin-boiled starch and oxidized starch, said acid converted, high amylose starch having an amylose content of about 50% and above and a dry alkaline fluidity of about 20 ml to about 70 ml. The acid converted high amylose starch is made in a unique process wherein the pH is maintained below about 1 during conversion and a temperature of about 40° C. to about 60° C. is maintained during the conversion process.

The process of acid conversion of high amylose starch in accordance with the present invention is unique because of the extremely low pH. The pH during acid conversion is maintained below about 1 and preferably at about 0.5. Measuring pH below 1 with a pH meter is impractical because most pH meters do not function well below 1. A more accurate means to measure the low pH is to measure the amount of 0.1N sodium hydroxide solution that is necessary to neutralize 25 milliliters (ml) of a starch slurry at a solids content of about 17 to about 20 Baume (Be), neutralization being defined as a pH of 8.3 when measured with a pH meter. To produce an acid converted high amylose starch in accordance with the present invention, a titer of between about 50 ml and about 60 ml of 0.1N sodium hydroxide is used. More preferably, the titer of 0.1N sodium hydroxide is about 54 ml to about 56 ml with good results occurring at a titer of about 55 ml.

The acid conversion is carried out for a fairly short period of time but long enough to provide the starch with a dry alkaline fluidity between about 20 mls and about 70 mls. More preferably, the dry alkaline fluidity of the acid converted starch of the present invention is between about 40 mls and about 50 mls, with good results at 45 mls.

Normal acid conversions take place over a period of about 18 to about 24 hours. The acid conversion of the high amylose starch made in accordance with the present invention is conducted in about 2 to about 24 hours and more preferably in about 4 to about 12 hours. Good results have been obtained in about 8 hours.

In order to measure the dry alkaline fluidity of the acid converted, high amylose starch of the present invention, the following procedure is employed.

A sample of 600-1000 mls of acidified slurry is neutralized with 3 Baume sodium hydroxide to a pH of about 5. Then purified water is added in an amount equal to 2.5 times the volume of slurry and dewatered using the basket centrifuge. The cake is screened through an 8 mesh screen and dried in a fluid bed at 60° C. to about 10–12% moisture. Next, in a 600 ml beaker, a 70 g sample of the acid converted starch is mixed with 150 mls of purified water tempered to 75° F.

To the slurry, 150 mls of 2 N sodium hydroxide is added and mixed for one minute. The slurry is then held at 75° F. in a water bath for 14 minutes for in-process samples and 29 minutes for flash-dried product. Then, the beaker is removed from the bath and stirred slowly for a few seconds to remove air bubbles. A 100 mm diameter Pyrex 60° angle funnel which has a stem (ID 0.8 cm) measuring 9 cm from the vertex of the funnel and fitted with a stainless steel tip (1/32 inch opening) was used for the test. This makes the overall height of the funnel from tip to rim 18.5 cm. The funnel is filled to a level of 2 cm below the rim of the funnel and paste is allowed to flow through the funnel and the stem for exactly one minute, keeping the level of paste in the funnel constant. Prior to collecting the paste, the paste is allowed to flow through the funnel and the stem for 20 seconds to condition the funnel stem and the tip. The paste is collected in a graduated cylinder and allowed to settle for 60 seconds to allow air bubbles to escape. Then the total volume of fluid in the cylinder is read as fluidity (in milliliters) and then either increased or decreased using the formula in Table A below to arrive at the final fluidity value. The initial fluidity reading is either increased or decreased according to the moisture content of the starch taken from the acid conversion. Moisture content is measured in a conventional manner using a CENCO Model No. 26675.

TABLE A

| Total Volume Fluid in Cylinder (ml) | Each Percentage Point of Moisture Above 10% | Each Percentage Point of Moisture Below 10% |
| --- | --- | --- |
| 0–25 | 0.5 | 1.0 |
| 26–74 | 0.5 | 0.5 |
| 75 and above | 1.0 | 0.5 |

In other words, if the initial volume of fluid collected in the cylinder is 50 mls, after settling for one minute, and if the starch had a moisture content of 12% when measured, then 1.0 ml is subtracted from the 50 to give a dry alkaline fluidity of 49.0 mls.

To assure proper fluidity measurements, the funnel and the tip must disperse 100 mls of laboratory grade water at 75° F. in 60 seconds following the above procedure.

The amylose content of the high amylose starch of the present invention is about 50% by weight and above; and preferably about 50% to about 65% by weight. Suitable sources of such high amylose starch include wheat, corn and barley. Maize is the preferred plant source of high amylose starch.

In order to make the acid converted, high amylose starch of the present invention, a slurry is formed having about 5% to about 40% by weight of a high amylose starch. The slurry is then heated to about 40° C. to about 60° C.; and more preferably, about 55° C. A mineral acid such as hydrochloric or sulfuric is added to the slurry to lower the pH to below 1. Hydrochloric acid is the preferred acid. The acidified slurry is then agitated and maintained at a temperature of about 40° C. to about 60° C., preferably about 55° C. for a period of about 2 hours to about 24 hours, preferably about 4 to about 12 hours; and more preferably about 8 hours to obtain a dry alkaline fluidity within the desired range. The acid converted starch is then dewatered, washed and dried in a conventional manner.

The starch blend used to make the starch jelly candy formulation in accordance with the present invention preferably comprises about 40% to about 90% by weight low viscosity, low amylose starch and about 60% to about 10% by weight of the acid converted, high amylose starch. More preferably, the starch blend comprises about 50% to about 80% by weight low viscosity, low amylose starch and about 50% to about 20% by weight acid converted, high amylose starch. Even more preferred is a starch blend that is about 75% by weight low viscosity, low amylose starch and about 25% by weight acid converted, high amylose starch.

Preferably the low viscosity, low amylose starch is either a thin-boiled starch or an oxidized starch. Whichever one of these two starches is employed, it should have a fluidity of about 50 ml to about 100 ml and, more preferably, about 60 ml to about 90 ml. Better results are obtained using a starch with a fluidity of about 90 ml. Thin-boiled starches are preferred for the low viscosity, low amylose starch.

The amylose content of the low viscosity, low amylose starch is below about 35% by weight and preferably below about 30% by weight. The amylose content is preferably above about 5%, e.g. waxy starches are not suitable for the low viscosity, low amylose starch.

Any suitable starch can be used for the low viscosity, low amylose starch so long as it has an amylose content which is above about 5% and below about 35% by weight. Suitable starches include potato, tapioca, rice, corn and wheat. Corn is the preferred source. Preferably, a common corn starch is used for the low viscosity, low amylose starch.

The thin-boiled starch used in accordance with the present invention is made in a conventional manner. Suitably, a slurry of about 5% to 40% by weight of a common corn starch is formed and mineral acid is added to the slurry. The slurry is then heated to about 30° C. to about 50° C. to convert the starch. The treatment with the acid lasts for about 1 to about 100 hours during which time the slurry is constantly agitated. Subsequently, the slurry is neutralized, dewatered, washed and dried in a conventional manner.

The oxidized starch used in accordance with the present invention is made in a conventional manner. Suitably, a slurry of about 25% to about 40% by weight of common corn starch is formed and an oxidizing agent such as sodium chlorite, calcium or sodium hypochlorite is added to the slurry. Sodium hypochlorite is formed in the aqueous solution of sodium hydroxide by bubbling chlorine gas through the solution. The sodium hypochlorite solution thus formed is then added to a starch slurry while maintaining the temperature of the starch slurry below about 45° C. Once the desired degree of conversion has taken place, the excess oxidizing agent (chlorine) is neutralized by the addition of sodium bisulfite. Then, the pH of the slurry is adjusted to about 6 and the slurry is dewatered, and the starch is washed and then dried in a conventional manner.

In order to determine fluidity of the thin-boiled and oxidized starch used in the present invention, the following procedure was used.

A size sample of 54 g of fluidized low amylose starch was placed in a 600 ml beaker. To this was added 150 ml of distilled water, at 75° F. (24° C.), to make a smooth paste. To this paste was added 150 ml of 3.6% NaOH at 75° F. The paste was then stirred for one minute. The stirred sample was then placed in a 75° F. water bath for 29 minutes. Then the same funnel and procedure as disclosed for the dry alkaline fluidity measurement is employed to measure the fluidity of the modified low amylose starch. Table A is also used to correct the fluidity numbers.

Preferably, the starch blend of the present invention makes up about 1% to about 25% of the starch jelly candy formulation. More preferably, the blend comprises about 5% to about 20% of the starch jelly formulation. Good results are obtained by using the starch blend of the present invention in the candy formulation in an amount of about 10% to about 15% by weight of the formulation.

The sweetener used in the starch jelly formulation of the present invention suitably comprises corn syrup having a DE between about 30 and about 90 and a sugar component. The sugar component can be a conventional sugar such as a monosaccharide, a disaccharide, or a trisaccharide. Suitable monosaccharides include glucose, fructose, ribose, arabinose, mannose, xylose, galactose, or mixtures thereof. Suitable disaccharides include sucrose, maltose, cellobiose, lactose, trehalose, or mixtures thereof. Suitable trisaccharides include maltotriose, raffinose, cellotriose, manninotriose, or mixtures thereof. The sugar component of the sweetener can also be a high intensity sweetener such as saccharine, aspartame, or Acesulfame-K. Mixtures of various conventional sugars and/or high intensity sweeteners can also be used. It is preferred to use sucrose as the sugar component of the sweetener.

The sweetener suitably comprises about 20% to about 90% by weight corn syrup and about 80% to about 10% by weight of the sugar component. It is preferred to use about 30% to about 80% by weight corn syrup and about 70% to about 20% by weight of the sugar component. It is most preferred to use about 40% to about 70% by weight corn syrup and about 60% to about 30% of the sugar component.

The amount of sweetener used varies depending on the desired sweetness and the other ingredients used in the starch jelly candy. Suitably the amount of sweetener added is about 25% to about 75% by weight of the starch jelly candy formulation of the present invention.

A flavoring and coloring component such as natural flavorants, artificial flavorants, coloring agents, fats, oils, surfactants, humectants, vitamins, or preservatives may also be included in the starch jelly candy of the present invention.

The natural flavorant can be a fruit flavorant such as a fruit puree, a fruit puree concentrate or dehydrated fruit solids. The natural flavorant can also be a spice flavorant.

If the flavoring and coloring component is used to make the starch jelly candy, it can be added in the amount of up to about 10% by weight of the starch jelly formulation. Preferably the starch jelly candy formulation contains about 0% to 10% by weight of a flavoring and coloring component.

Water is added to the starch jelly formulation as needed to dissolve the solid components of the formulation. Water is suitably added in the amount of between about 20% and 75% by weight of the starch jelly candy formulation of the present invention.

In order to make a starch jelly candy in accordance with the present invention, first the components of the formulation, except color and flavor, are combined and stirred together in a container and the contents of the container are preheated or prepasted at a temperature between about 70° C. and about 90° C. The prepasted mass is then mixed with the color and flavor components and heated to between about 150° C. and about 170° C. Any conventional piece of equipment, such as a scraped surface heat exchanger or a jet cooker, is used to heat and mix the formulation. After heating, the starch jelly candy formulation is deposited into a mold and allowed to set. The steps for forming the starch jelly candy are conventional and conventional equipment can be employed.

Preferably, the starch blend is made and then added as a blend to the candy formulation. The two starches can be blended either in a dry state or in a slurried state followed by drying of the slurry mixture. Alternatively, the blend is formed in-situ by adding the individual starch components into the candy formulation.

These and other aspects of the present invention may be more fully understood with reference to the following examples:

EXAMPLE 1

This example illustrates making an acid converted, high amylose starch in accordance with the present invention.

An aqueous slurry of 18 Baume was made using a high amylose corn starch having an amylose content of 50%. The amylose content was measured by an Amylose Colorimetric technique. This slurry was heated to about 55° C. and maintained at this temperature throughout the acid conversion. The protein content of the starch was below about 0.5% by weight dry basis.

When the slurry was up to temperature, hydrochloric acid was added and mixed into the slurry until it took 55 ml of an 0.1N sodium hydroxide solution to neutralize (pH 8.3) 25 ml of acidified slurry at 18 Be.

The dry alkaline fluid was measured through the conversion (in process sample procedure) until the desired end point was obtained. It took 8 hours to obtain a dry alkaline fluidity of 45 ml.

Once the proper dry alkaline fluidity was obtained, the slurry was neutralized with 6 Be sodium hydroxide and the resulting slurry dried to a moisture content below 12%.

EXAMPLE 2

This example illustrates making a starch jelly candy in accordance with the present invention.

The following formulation is employed:

| Ingredient | Amount (% by weight) |
| --- | --- |
| 44/62 CSU | 44.9 |
| Sugar, fine granular sucrose | 32.0 |
| Water | 12.4 |
| 90 thin-boiled starch | 7.4 |
| Acid converted high amylose starch | 3.1 |
| Citric acid | 0.1 |
| Sodium citrate | 0.1 |

The acid converted, high amylose starch is made in accordance with Example 1 above from a corn starch having 50% amylose. The 90 thin-boiled starch is a conventional thin boiled starch made from common corn starch, 28% amylose, and having an alkaline fluidity of 90 mls. The 44/62 CSU is corn syrup made from common corn starch and having a dextrose equivalent (DE) of 62 and a solids content (Baume) of 44.

All the ingredients are mixed together, prepasted at 76° C. and then heated to 163° C. using a jet cooker with 150 psi steam. Once cooked, the candy formulation is deposited into starch molds and allowed to solidify at ambient pressure and temperature to a starch jelly candy.

EXAMPLE 3

Example 2 is repeated except the 90 thin-boiled starch is replaced with an oxidized starch having an alkaline fluidity of 90 mls.

It will be understood that the claims are intended to cover all changes and modifications of the preferred embodiments of the invention herein chosen for the purpose of illustration which do not constitute a departure from the spirit and scope of the invention.

What is claimed is:

1. A starch jelly candy comprising a cooked gelled starch formulation wherein said formulation contains:
   (a) a sweetener;
   (b) about 1% to about 25% by weight of a starch blend comprising about 40% to about 80% by weight low viscosity, low amylose starch having an amylose content below 35% by weight, said low viscosity, low amylose starch selected from the group consisting of thin-boiled starch and oxidized starch, and about 60% to about 20% by weight of an acid converted, high amylose starch having an amylose content about 50% to about 65% by weight, said acid converted, high amylose starch being prepared by a process in which a slurry of starch granules are converted by a mineral acid at a pH of below about 1 and a temperature of about 40° C. to about 60° C. for about 4 to about 12 hours to a dry alkaline fluidity of about 20 ml to about 70 ml; and
   (c) water.

2. The starch jelly candy of claim 1 wherein said thin-boiled starch has an alkaline fluidity of about 60 ml to about 90 ml.

3. The starch jelly candy of claim 1 wherein said modified starch is corn starch and said acid converted, high amylose starch is corn starch.

4. The starch jelly candy of claim 1 wherein said formulation comprises:
   about 2% to about 75% by weight of said sweetener;
   about 20% to about 75% by weight water; and
   about 0% to about 10% by weight of a flavoring and coloring component.

5. The starch jelly candy of claim 4 wherein said sweetener comprises a corn syrup having a DE between about 30 and about 90 and a sugar component selected from the group consisting of monosaccharides, disaccharides, trisaccharides, high intensity sweeteners and mixtures thereof.

6. The starch jelly candy of claim 4 wherein said flavoring and coloring component is comprised of one or more elements selected from the group consisting of natural flavorants, artificial flavorants, coloring agents, fats, oils, surfactants, humectants, vitamins or preservatives.

7. The starch jelly candy of claim 5 wherein said sweetener comprises about 20% to about 90% by weight corn syrup and about 80% to about 10% by weight of sugar component.

8. The starch jelly candy of claim 6 wherein the sugar component is sucrose.

9. The starch jelly candy of claim 7 wherein said natural flavorant is a fruit flavorant selected from the group consisting of fruit puree, fruit puree concentrate and dehydrated fruit solids.

10. A method for making starch jelly candy thickener from a high amylose starch comprising the steps of:
    (a) forming a slurry of water and starch wherein said starch has an amylose content of about 50% to about 65% by weight;
    (b) heating said slurry to a temperature of about 40° C. to about 60° C.;
    (c) adding a mineral acid to lower the pH to below about 1; and
    (d) maintaining the temperature of the slurry at about 40° C. to about 60° C. for about 4 to about 12 hours to produce an acid converted starch having a dry alkaline fluidity of about 20 ml to about 70 ml.

11. The method of claim 10 wherein the slurry is heated to about 55° C. and maintained at about 55° C.

12. The method of claim 10 wherein the dry alkaline fluidity of the acid converted starch is about 40 ml to about 50 ml.

13. The method of claim 11 wherein the temperature is maintained at about 55° C. for about 8 hours.

14. The method of claim 10 wherein said mineral acid is hydrochloric acid and the amount added is such that about 25 ml of starch slurry is neutralized (pH 8.3) by about 55 mls of 0.1N sodium hydroxide.

15. The method of claim 10 wherein the dry alkaline fluidity of the acid converted starch is about 45 ml.

16. A starch jelly candy thickener produced by the process of claim 10.

17. A starch jelly candy thickener produced by the process of claim 13.

* * * * *

UNITED STATES PATENT AND TRADEMARK OFFICE
CERTIFICATE OF CORRECTION

PATENT NO. : 5,262,191

DATED : November 16, 1993

INVENTOR(S) : Kumaresh Chakraborty et al.

It is certified that error appears in the above-identified patent and that said Letters Patent is hereby corrected as shown below:

Column 8, line 15 (claim 9), change the dependency from "claim 7" to --claim 6--.

Signed and Sealed this

Twenty-sixth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,262,191

DATED        : November 16, 1993

INVENTOR(S)  : Kumaresh Chakraborty et al.

It is certified that error appears in the above-identified patent and that said Letters Patent is hereby corrected as shown below:

Column 7:
Claim 4, line 42, change "2%" to --25%--.

Signed and Sealed this

Twentieth Day of September, 1994

Attest:

BRUCE LEHMAN

Attesting Officer

Commissioner of Patents and Trademarks